A. ANDERSON.
ANIMAL CONTROLLING DEVICE.
APPLICATION FILED JUNE 29, 1914.
1,125,247.
Patented Jan. 19, 1915.
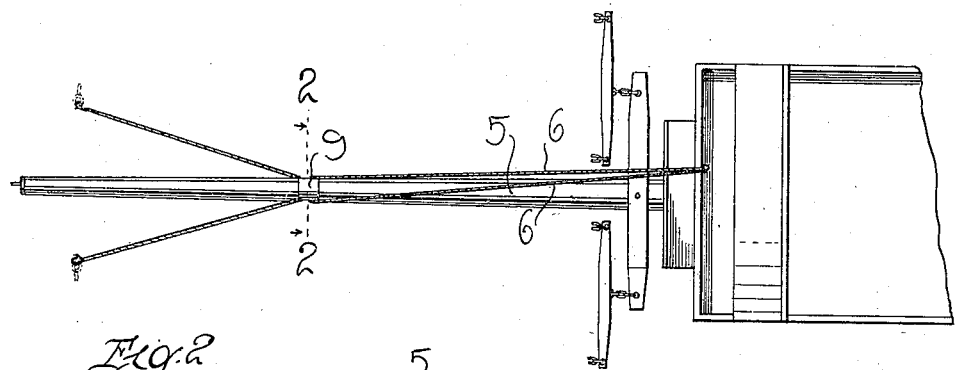
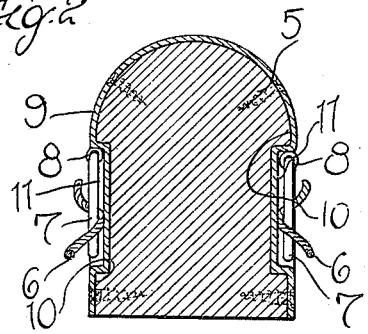
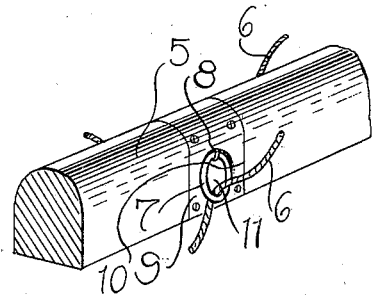
Inventor
August Anderson

UNITED STATES PATENT OFFICE.

AUGUST ANDERSON, OF LOUISVILLE, KENTUCKY.

ANIMAL-CONTROLLING DEVICE.

1,125,247. Specification of Letters Patent. Patented Jan. 19, 1915.

Application filed June 29, 1914. Serial No. 848,021.

*To all whom it may concern:*

Be it known that I, AUGUST ANDERSON, a citizen of the United States, residing at Louisville, in the county of Jefferson and State of Kentucky, have invented certain new and useful Improvements in Animal-Controlling Devices, of which the following is a specification, reference being had to the accompanying drawings.

This invention relates to an improved animal controlling device, and has for its primary object to provide a simple, efficient, and reliable means for bringing the horses attached to a vehicle under control in the event of their bolting or running away.

Considered in its more specific aspect, the present invention provides means for accomplishing the above purpose including a rope or strap connected to the bridles of the animals, and improved guiding means therefor mounted upon the pole or tongue of the vehicle, whereby liability of said rope becoming entangled in the harness is obviated and the same at all times maintained in proper position for immediate use in cases of emergency.

With the above and other objects in view, the invention consists in novel features of construction, combination, and arrangement of parts will be hereinafter referred to and more particularly pointed out in the specification and claim.

For a full understanding of the invention, reference is to be had to the following description and accompanying drawing, in which—

Figure 1 is a plan view of the forward portion of a vehicle and the tongue thereof illustrating the application of the present invention; Fig. 2 is a section taken on the line 2—2 of Fig. 1; Fig. 3 is an enlarged fragmentary perspective view of the tongue or pole showing the guide device arranged thereon.

Referring in detail to the drawing, 5 designates the pole or tongue of a wagon or other vehicle, upon opposite sides of which the horses are arranged and harnessed in the usual manner.

In the illustrated embodiment of the invention, I have shown a single length of heavy rope doubled upon itself to provide spaced strands 6 extending along the opposite sides of the tongue 5. It is of course, obvious that, if desired, a leather strap may be used in lieu of this rope. The ends of the rope strands 6 which extend upwardly from the vehicle tongue 5 are connected to the respective bridle bits of the draft animals. In order to guide the rope in its movement and prevent the same from becoming entangled in the harness, I employ the rings 7 which are preferably pivotally mounted as at 8 upon opposite sides of a U-shaped plate 9. This plate is arranged upon the pole or tongue 5 substantially midway between its ends and is preferably countersunk therein, as clearly indicated at 10 in Fig. 3 of the drawing. The opposite sides of the U-shaped plate 9 are also provided with circular depressions or recesses 11 to receive the respective rings 7. Thus, it will be seen that normally, the metal plate 9 and the ring 7 are disposed flush with the surfaces of the pole or tongue so that there are no projections which might engage with the bodies of the animals. By providing the recesses 11 for the reception of the rings 7, it will also be appreciated that all liability of these rings being distorted or broken off of the plate 9 is obviated.

The longitudinally extending portions of the pull rope or strap extend through the rings 7 on the opposite sides of the pole or tongue, and there is sufficient slack in the rope to permit the rings to hang downwardly from their pivots 8 and occupy the recesses under normal conditions, thus maintaining the rope closely against the sides of the tongue. The inner end of the rope is attached conveniently near the driver's seat. Should the animals become frightened and bolt or run away, the driver simply pulls upon the rope 6 and thus draws the animals' heads inwardly and backwardly toward each other. In this manner, it will be seen that the animals may be quickly brought to a stop.

From the foregoing description taken in connection with the accompanying drawing, it is believed that the construction, manner of operation, and several advantages of my invention will be clearly and fully understood. The device, while exceedingly simple in its construction, is, nevertheless, highly reliable and serviceable in practical use. It may also be produced at small manufacturing cost and readily attached to the tongue of a wagon or other vehicle.

While I have above described the preferred form, construction, and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

A device of the character described comprising in combination with a vehicle tongue, a pull rope having spaced portions extending along opposite sides of the vehicle tongue and connected at their forward ends to the bridles of the draft animals, a U-shaped plate secured upon the vehicle tongue flush with the surface thereof, said plate being provided in opposite sides with circular recesses, and rings pivotally mounted upon the opposite sides of the plate through which said rope extends, said rings being normally disposed within the recesses in said plate.

In testimony whereof I hereunto affix my signature in the presence of two witnesses.

AUGUST ANDERSON.

Witnesses:
ARVID WORALL,
P. J. BOHNÉ.

Copies of this patent may be obtained for five cents each, by addressing the "Commissioner of Patents, Washington, D. C."